US012802680B2

(12) United States Patent
Yun et al.

(10) Patent No.: US 12,802,680 B2
(45) Date of Patent: Nov. 17, 2026

(54) METHOD AND APPARATUS FOR CONSTRUCTING DOMAIN-SPECIFIC SPEECH RECOGNITION MODEL AND END-TO-END SPEECH RECOGNIZER USING THE SAME

(71) Applicant: ELECTRONICS AND TELECOMMUNICATIONS RESEARCH INSTITUTE, Daejeon (KR)

(72) Inventors: Seung Yun, Daejeon (KR); Sanghun Kim, Daejeon (KR); Min Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 469 days.

(21) Appl. No.: 17/979,471

(22) Filed: Nov. 2, 2022

(65) Prior Publication Data

US 2023/0215419 A1 Jul. 6, 2023

(30) Foreign Application Priority Data

Jan. 5, 2022 (KR) ........................ 10-2022-0001723

(51) Int. Cl.
*G10L 13/04* (2013.01)
*G10L 15/16* (2006.01)
*G10L 15/30* (2013.01)

(52) U.S. Cl.
CPC .............. *G10L 13/04* (2013.01); *G10L 15/16* (2013.01); *G10L 15/30* (2013.01)

(58) Field of Classification Search
CPC ......... G10L 13/04; G10L 15/16; G10L 15/30; G10L 13/00; G10L 15/183; G10L 15/063;
(Continued)

(56) References Cited

U.S. PATENT DOCUMENTS 10,249,294 B2 4/2019 Kim et al.
10,388,275 B2 8/2019 Kim et al.
(Continued)

FOREIGN PATENT DOCUMENTS

KR 20190080833 A 7/2019
KR 20200074624 A 6/2020
(Continued)

OTHER PUBLICATIONS

Text version of Strimel et al (U.S. Pat. No. 11,887,583) (Year: 2024).*

*Primary Examiner* — Michael N Opsasnick
(74) *Attorney, Agent, or Firm* — Rabin & Berdo, P.C.

(57) ABSTRACT

Provided is an end-to-end speech recognition technology capable of improving speech recognition performance in a desired specific domain, which includes collecting domain text data be specialized and comparing the data with a basic transcript text DB to determine domain text that is not included in the basic transcript text DB and requires additional training and constructing a specialization target domain text DB. The end-to-end speech recognition technology generates a speech signal from the domain text of the specialization target domain text DB, and trains a speech recognition neural network with the generated speech signal to generate an end-to-end speech recognition model specialized for the domain to be specialized. The specialized speech recognition model may be applied to the end-to-end speech recognizer to perform the domain-specific end-to-end speech recognition.

10 Claims, 6 Drawing Sheets

(58) Field of Classification Search
CPC ......... G10L 13/02; G10L 15/14; G10L 15/26; G06N 3/08
See application file for complete search history.

(56) References Cited

U.S. PATENT DOCUMENTS

| | | | | |
|---|---|---|---|---|
| 11,887,583 | B1 * | 1/2024 | Strimel | G10L 15/16 |
| 2018/0143974 | A1 * | 5/2018 | Skarbovsky | G06F 40/58 |
| 2020/0035222 | A1 * | 1/2020 | Sypniewski | G06F 18/24133 |
| 2020/0175961 | A1 * | 6/2020 | Thomson | G10L 15/063 |
| 2020/0349922 | A1 * | 11/2020 | Peyser | G10L 15/063 |
| 2020/0357388 | A1 * | 11/2020 | Zhao | G10L 15/26 |
| 2021/0082437 | A1 * | 3/2021 | Thomas | G10L 15/32 |
| 2021/0312906 | A1 * | 10/2021 | Kuo | G10L 15/1822 |
| 2022/0044684 | A1 * | 2/2022 | Aharoni | G10L 15/26 |
| 2022/0122579 | A1 * | 4/2022 | Biadsy | G10L 21/04 |
| 2022/0230628 | A1 * | 7/2022 | Zhu | G06F 16/90332 |
| 2023/0016637 | A1 * | 1/2023 | Schmidt | G06N 3/045 |
| 2023/0215419 | A1 * | 7/2023 | Yun | G10L 13/04 704/258 |

FOREIGN PATENT DOCUMENTS

| | | | | |
|---|---|---|---|---|
| KR | 20210089347 A | | 7/2021 | |
| KR | 20210102456 A | | 8/2021 | |
| WO | WO-2020171868 A1 | * | 8/2020 | G06N 3/0464 |

* cited by examiner

METHOD AND APPARATUS FOR CONSTRUCTING DOMAIN-SPECIFIC SPEECH RECOGNITION MODEL AND END-TO-END SPEECH RECOGNIZER USING THE SAME

CROSS-REFERENCE TO RELATED APPLICATION

This application claims priority to and the benefit of Korean Patent Application No. 10-2022-0001723, filed on Jan. 5, 2022, the disclosure of which is incorporated herein by reference in its entirety.

BACKGROUND

1. Field of the Invention

The present invention relates to speech recognition, and more particularly, to a neural network technology for end-to-end speech recognition.

2. Discussion of Related Art

With the development of artificial intelligence technology, speech recognition technology is spreading widely. In particular, with the recent development of end-to-end speech recognition technology trained using a neural network with a speech signal as an input and a text string as an output, speech recognition performance has remarkably improved compared to the past.

However, the end-to-end speech recognition technology requires a speech-transcript pair (including a file that speech signal is recorded and a transcript recording the file). For this reason, compared to the conventional speech recognition technology in which an acoustic model, a language model, and a pronunciation dictionary are separated, the end-to-end speech recognition technology has a disadvantage in that the amount of text used is absolutely insufficient, and thus the speech recognition performance for a specific domain that had not been included in the training is relatively inferior.

Also, as the speech-transcript pairs are required together when trying to specialize a domain in order to improve the performance of the desired specific domain, there is a problem in that it is difficult to collect data for specialization, and thus it is difficult to specialize the domain.

SUMMARY OF THE INVENTION

The present invention is directed to providing an end-to-end speech recognition technology capable of improving speech recognition performance in a specific domain.

In order to achieve the above object, the present invention provides a method and apparatus for generating a speech recognition model capable of specializing a domain using easily collected text data without using a speech-transcript pair (i.e., a file in which a speech signal is recorded and a transcript recording the file) to improve speech recognition performance in the specialized domain, and an end-to-end speech recognizer using the same.

A method and apparatus for generating a domain-specific end-to-end speech recognition model according to an aspect of the present invention may be implemented as a computer system including a storage device and a processor.

The processor collects text data of a domain to be specialized (hereinafter, "domain text data"), and compares the collected domain text data with a speech-transcript text DB (hereinafter, "basic transcript text database (or DB)") included in the storage device to determine domain text that is not included in the basic transcript text DB and requires additional training and construct a specialization target domain text DB in the storage device. In addition, the processor uses a speech synthesizer (or executes a speech synthesis program) to generate a speech signal from the domain text of the specialization target domain text DB, and trains a speech recognition neural network with the generated speech signal to generate an end-to-end speech recognition model specialized for the domain to be specialized. The specialized speech recognition model may be applied to the end-to-end speech recognizer to perform the domain-specific end-to-end speech recognition.

In addition, the processor may use the specialization target domain text DB to generate a domain-specific language model and/or a domain-specific user vocabulary, and reflect the generated domain-specific language model and/or domain-specific user vocabulary in a speech recognition process to adjust a specialized weight.

According to another aspect of the present invention, there is provided a domain-specific end-to-end speech recognizer using the domain-specific speech recognition model.

A more detailed configuration and operation of the present invention will become clearer through specific embodiments described later with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods accomplishing them will become apparent from exemplary embodiments described in detail with reference to the accompanying drawings. However, the present invention is not limited to the embodiments described below, but may be embodied in various other forms. Embodiments are only provided to completely disclose the present invention and to completely inform those skilled in the art to which the present invention pertains of the scope of the invention, and the present invention will be defined by the claims. In addition, terms used herein are for explaining embodiments rather than limiting the present invention. Unless otherwise stated, a singular form includes a plural form in the present specification. In addition, components, steps, operations, and/or elements described by the terms "comprise," "comprising," and the like used herein do not exclude the existence or addition of one or more other components, steps, operations, and/or elements.

Hereinafter, exemplary embodiments of the present invention will be described in detail with reference to the accompanying drawings. In describing embodiments, well-known constructions or functions will not be described in detail since they may unnecessarily obscure the understanding of the present invention.

Figure 1:
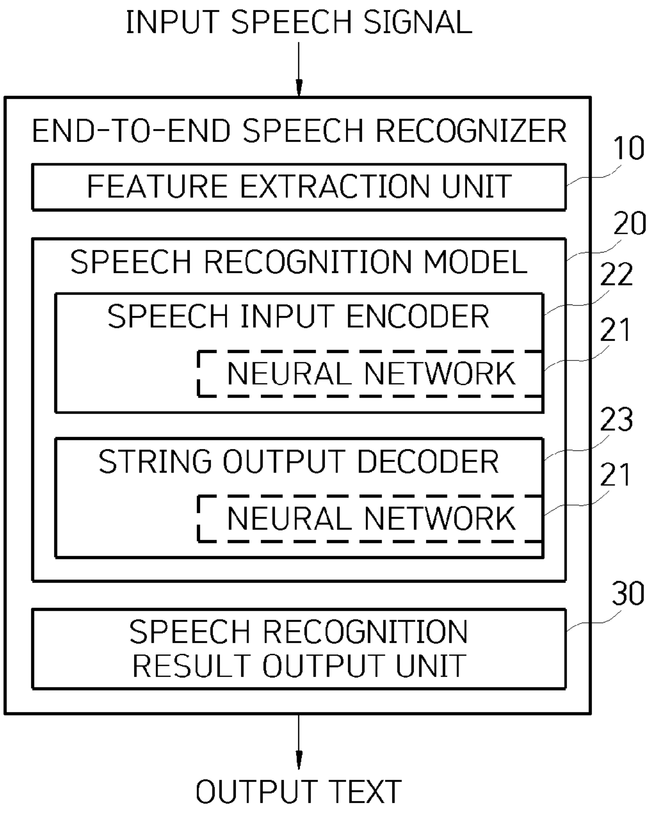
FIG. 1 is a configuration diagram of a general end-to-end speech recognizer.

FIG. 1 is a configuration diagram of a general end-to-end speech recognizer.

When a speech signal is input to the end-to-end speech recognizer, a feature extraction unit 10 extracts features in a structure suitable for the speech recognizer to process, for example, in the form of a Mel Filter Bank. The extracted features are received by a speech input encoder 22 of a speech recognition model 20. The speech input encoder 22 is trained by a neural network 21 and outputs an encoded value for each frame of the speech signal. A string output decoder 23 receives the encoded value, calculates which encoded output to pay attention to using the neural network 21, and outputs a final string using the neural network 21. Here, the speech recognition model 20 having the attention-based encoder-decoder structure is described as an example, but the end-to-end speech recognizer is not limited to this structure. Finally, a speech recognition result output unit 30 outputs speech recognition result text by performing text symbol post-processing on the final string output from the decoder 23.

The "general or basic" end-to-end speech recognizer illustrated in FIG. 1 is a speech recognizer in a state in which domain specialization has not been performed, unlike a "domain-specific" end-to-end speech recognizer according to an embodiment of the present invention, which will be described later. In this basic end-to-end speech recognizer, it is necessary to generate a speech-transcript text DB with a sufficient amount of speech-transcript pairs. It is important to set basic speech recognition units in this process. It is advantageous for domain-specification to set the speech recognition units so that the speech recognition units are distributed with relatively even statistics. Since the number of speech recognition units is too large when words are used as a unit for recognition, the speech recognition units are usually segmented into subword units. Recently, Byte Pair Encoding has been mostly used.

In this case, it is better not to increase the number of final speech recognition units too much so that a statistical distribution gap between subword speech recognition units, which are the results of the Byte Pair Encoding, does not appear too large. This is because, when the distribution gap appears too large, units appearing less frequently in the database need to include a relatively large amount of data in domain specialization according to the present invention, which will be described later, for domain specialization. When the speech recognition units are configured with a relatively even distribution, the domain specialization is possible even with a relatively small amount of data. In the case of Korean language, setting the subword speech recognition unit to 2300 to 2400 syllables, which is the number of syllables actually used, rather than setting about 10,000 subword speech recognition units through the Byte Pair Encoding, is advantageous because Korean has a relatively even distribution in terms of the statistical distribution.

Figure 2:
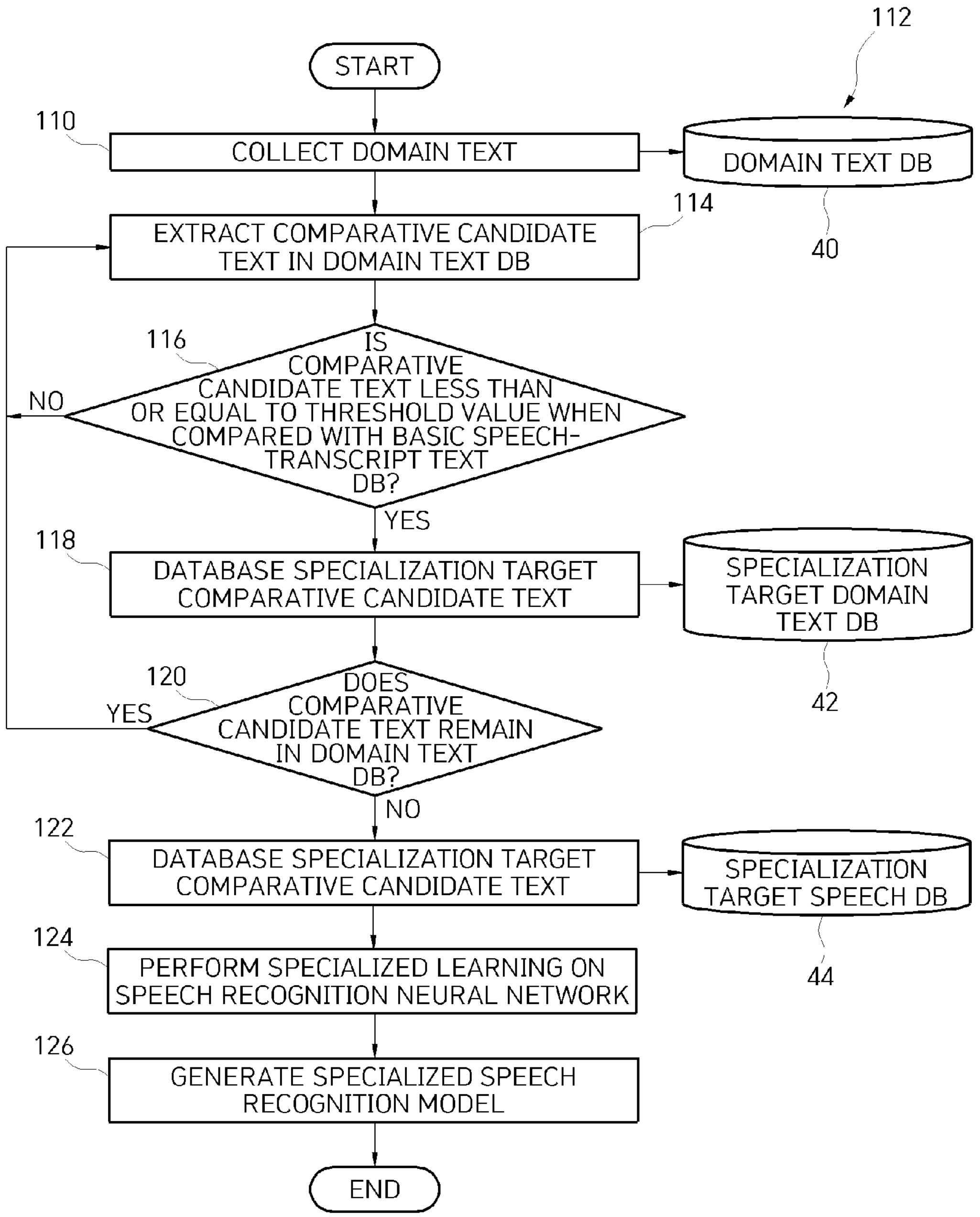
FIG. 2 is a configuration diagram of a method of creating a domain-specific speech recognition model according to an embodiment of the present invention.

FIG. 2 is a configuration diagram of operations of a method of creating a domain-specific speech recognition model according to an embodiment of the present invention. Although FIG. 2 illustrates a step-by-step task processing flow in a methodological aspect, it is easy for those skilled in the art to derive a processing unit of an apparatus for generating a domain-specific speech recognition model according to another aspect of the present invention.

The method of creating a domain-specific end-to-end speech recognition model according to an embodiment of the present invention may be executed by a computer system including a storage device and a processor. In addition, an apparatus for generating a domain-specific end-to-end speech recognition model according to another embodiment of the present invention may be implemented as general-purpose computer hardware including a storage device and a processor, and software used in combination with or independent of the general-purpose computer hardware, or may be implemented as a combination (for example, a digital signal processor (DSP), a processor, a controller, an application-specific integrated circuit (ASIC), a programmable logic device (FPGA), etc.).

Referring to FIG. 2, the method and apparatus for generating a domain-specific end-to-end speech recognition model according to an embodiment of the present invention starts from an operation 110 of collecting raw domain data (concretely speaking, domain text). When it is decided to specialize the speech recognizer in a specific domain, first, the raw domain data that includes enough text that may appear in an application domain to be specialized is collected. In general, since words that are difficult for speech recognition are jargon, proper nouns, and foreign words, etc., that are not included in the training of the basic end-to-end speech recognizer (see FIG. 1), the words are collected to be sufficiently included, and not only words, but also actually uttered sentences including those words need to be collected together. For sophisticated collection, a person may directly write candidate sentences, or an existing dictionary and example sentences may be used as domain text. In order to minimize human intervention and automate the following whole process from the domain text collection, data such as a homepage, a social networking service (SNS), or blog may be automatically collected by using a web crawler after determining only keywords to be collected. Of course, in this case, if there are existing services operated and thus it is possible to use text log data, the log data may be easily used.

When the raw domain data is collected, text is extracted from the data, and a domain text database 40 is constructed (or databased) through a normalization process for symbols, numbers, foreign language notation, etc., included in the extracted text (112).

Next, an operation of extracting comparison candidate text (i.e., a comparison target) from the constructed domain text DB 40 is executed (114). To this end, the comparison candidate text such as a word, a word chain (N-Gram), or a sentence unit is extracted from the domain text DB 40 as a comparison target.

In the next operation, by comparing the speech-transcript text DB used to make the basic end-to-end speech recognizer of FIG. 1 with the comparison candidate text of the domain text DB 40, candidates less than or equal to a predetermined threshold value are found (116). The threshold value may be determined simply using the number of appearances or may also be determined relatively in consideration of the size of the entire text.

The specialization target comparison candidate text determined, in the comparison operation 116, as the domain data to be specialized is databased into the specialization target domain text DB 42 (118). This process is repeatedly performed until it is determined whether the comparative candidate text remains in the domain text DB 40 (120).

When the comparison operation 116 performing on the entire domain text DB 40 is completed and the specialization target domain text DB 42 is constructed, the specialization target domain text DB 42 is used to generate the actual speech, that is, the specialization target speech, thereby constructing the specialization target domain text DB 42. Here, speech is generated in the same format as speech used to generate the speech recognition model 20 of the basic end-to-end speech recognizer (see FIG. 1). Also, if possible, speech may be generated from many voices in order to improve speech recognition performance. A single-speaker synthesizer may be used in various ways, or a multi-speaker speech synthesizer that may receive various speaker embeddings and generate a synthesized sound with the speakers' tones may be used (nevertheless, generating speech with the single-speaker synthesizer may cause some performance deterioration, but is helpful from a domain-specific point of view.).

When the specialization target speech is generated (122), a speech recognition neural network is trained using the specialization target speech (124), which will be referred to as "specialized learning." As the specialized learning method, the speech recognition neural network may be trained from the beginning by using both basic voice data and newly generated specialized speech, and the existing general speech recognition neural network may be additionally trained using connection learning or transfer learning. The latter additional learning may target the entire encoder and decoder, target only the encoder or decoder, or, in some cases, target only some layers.

After the specialized learning of the speech recognition neural network is completed (124), the domain-specific (i.e., specialized) speech recognition model is generated using the specialized speech recognition neural network (126). As described in the description of FIG. 1 above, the domain-specific speech recognition model may be configured in an attention-based encoder-decoder structure, but is not limited thereto.

Figure 3:
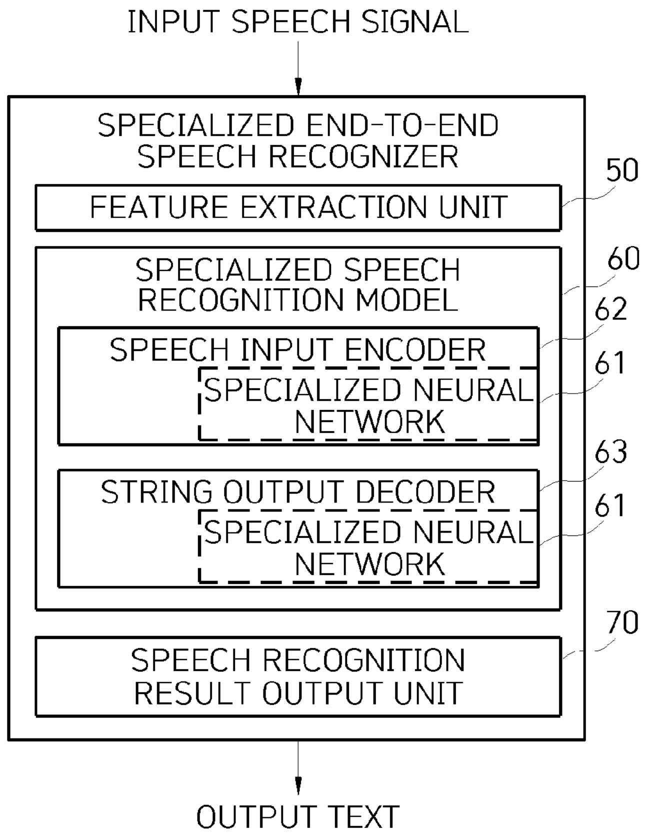
FIG. 3 is a configuration diagram of an end-to-end speech recognizer using a domain-specific speech recognition model according to an embodiment of the present invention.

FIG. 3 is a configuration diagram of the domain-specific end-to-end speech recognizer using the domain-specific speech recognition model.

A domain-specific speech recognition model 60 is configured with a domain-specific speech recognition neural network 61 generated through the process of FIG. 2, and by replacing the speech recognition model 20 of the speech recognizer described in FIG. 1 with this specialized speech recognition model 60, the specialized end-to-end speech recognizer according to the present invention is configured.

When the speech signal is input to the specialized end-to-end speech recognizer, a feature extraction unit 50 extracts features in a structure suitable for the speech recognizer to process, for example, in the form of a Mel Filter Bank. The extracted features are received by the speech input encoder 62 of the speech recognition model 60. The speech input encoder 62 is trained by the specialized neural network 61 and outputs encoded values for each frame of the speech signal. A string output decoder 63 receives the encoded value, calculates which encoded output to pay attention to using the neural network 61, and outputs the final string using the neural network 21. Here, the speech recognition model 60 having the attention-based encoder-decoder structure is described as an example, but the end-to-end speech recognizer of the present invention is not limited to this structure. Finally, a speech recognition result output unit 70 outputs speech recognition result text by performing text symbol post-processing on the final string output from the decoder 63.

Figure 4:
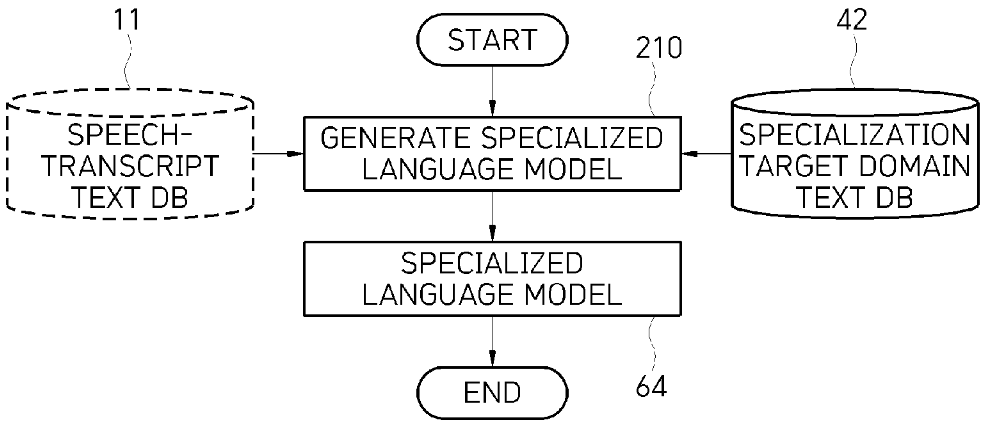
FIG. 4 is a flowchart illustrating a method of generating a specialized language model.

The specialized end-to-end speech recognizer may be configured as illustrated in FIG. 3, but when a person wants to additionally control a degree of specialization using a weight, a specialized language model may be generated. FIG. 4 is a flowchart illustrating a method of generating such a specialized language model.

In FIG. 4, a specialized language model 64 may be generated using only the specialization target domain text DB 42 illustrated in FIG. 2 (210), and, if necessary, it is also possible to generate the specialized language model 64 by merging with the speech-transcript text DB 11 used to generate the general end-to-end speech recognizer (210). In this case, if necessary, each relative weights of the specialization target domain text may be adjusted by changing (reducing or increasing) the amount of the text in the specialization target domain text DB 42. The language model may be finally generated as an N-Gram-based statistical language model or a neural network-based language model such as RNN or a transformer.

The specialized weight is adjusted using the generated specialized language model 64. The specialized language model 64 and the adjustment of the weight using the specialized language model 64 will be described in more detail below.

First, a validation set and a test set that may represent the specialization target domain are selected from the specialization target domain text DB 42. Thereafter, similarity between each sentence of the corresponding validation set and a sentence embedding vector between each sentence in the specialization target domain text DB 42 is measured.

Next, high weights are assigned to sentences with high similarity according to similarity, and low weights are assigned to sentences with low similarity to primarily generate a specialized language model.

It is checked whether an appropriate expected level of perplexity is measured by calculating perplexity for the text set using the generated specialized language model.

When the perplexity is higher than the target, a higher weight than before is assigned to sentences in the specialization target domain text DB having high similarity to the validation set, and a lower weight than before is assigned to sentences having low similarity to regenerate the language model. When the perplexity is lower than the target, a lower weight than before is assigned to sentences in the specialization target domain text DB 42 having high similarity to the validation set, and a higher weight than before is assigned to sentences having low similarity to regenerate the language model. The process is repeated until the perplexity reaches the target expected value to generate the final specialized language model 64.

When the specialized language model 64 is generated, the speech recognition performance is measured after combining the language model with an actual speech recognizer. When actual speech exists for the specialized test set, the actual speech is used, and when there is no speech, a speech signal is generated for the test set sentence using the speech synthesizer, and then the speech recognition performance is measured.

In this case, the speech recognition performance is measured by applying various language model weights, and for the test set, the speech recognition results appear to meet the expected goals, and at the same time, the appropriate language model weights that do not degrade the existing speech recognition performance are found and applied.

Figure 5:
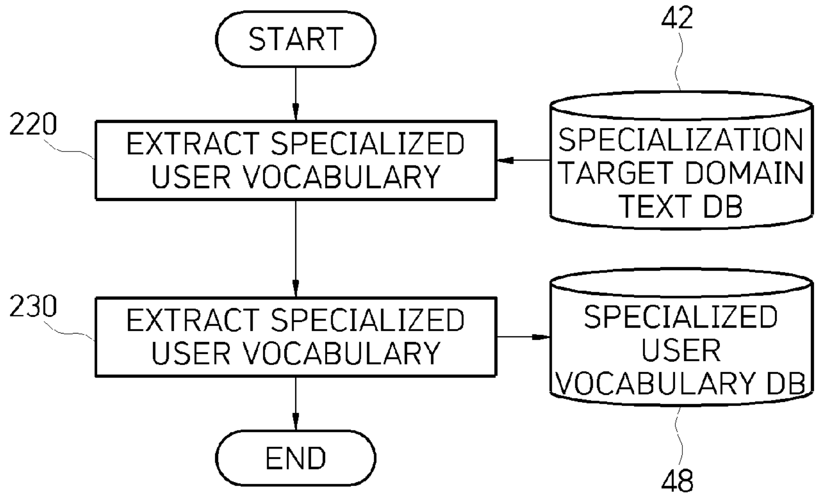
FIG. 5 is a flowchart illustrating a method of generating a specialized user vocabulary database (DB) by extracting a specialized user vocabulary.

Meanwhile, in order to adjust the specialized weight, the specialized language model 64 generated as illustrated in FIG. 4 may be used or the specialized user vocabulary DB may also be used. FIG. 5 is a flowchart illustrating a method of generating a specialized user vocabulary DB 48 by extracting a specialized user vocabulary.

The specialized user vocabulary is extracted from the specialization target domain text DB 42 (220) and stored as a specialized user vocabulary (230) to generate the specialized user vocabulary DB 48.

When the specialized user vocabulary DB 48 is generated, an evaluation sentence including the corresponding vocabulary is composed of various combinations. (For example, in the case of 'school," "Today I will go to 'school'.", "Did you go to 'school'?", etc.)

For the sentences for evaluation, a speech signal utterance set for evaluation is constructed using real human voice, or if impossible, the speech signal is generated through the speech synthesizer to construct a speech signal utterance set for evaluation.

Thereafter, the speech recognition evaluation is performed on the speech signal utterance set for evaluation using the speech recognizer combined with the specialized user vocabulary to assign a low weight to a specialized user vocabulary that is good in speech recognition, and assigns a relatively high weight to a specialized user vocabulary that is not good in speech recognition.

Through these various weight combination experiments, finally, the weights are adjusted for each specialized user vocabulary to show the best result value for the entire evaluation speech signal utterance.

The specialized language model 64 is separately generated and then operated by being fused with the speech recognition model 60, but the specialized user vocabulary DB 48 may be operated by explicitly adjusting the weight like a phrase hint (as another name, speech context) from the outside without being fused.

Figure 6:
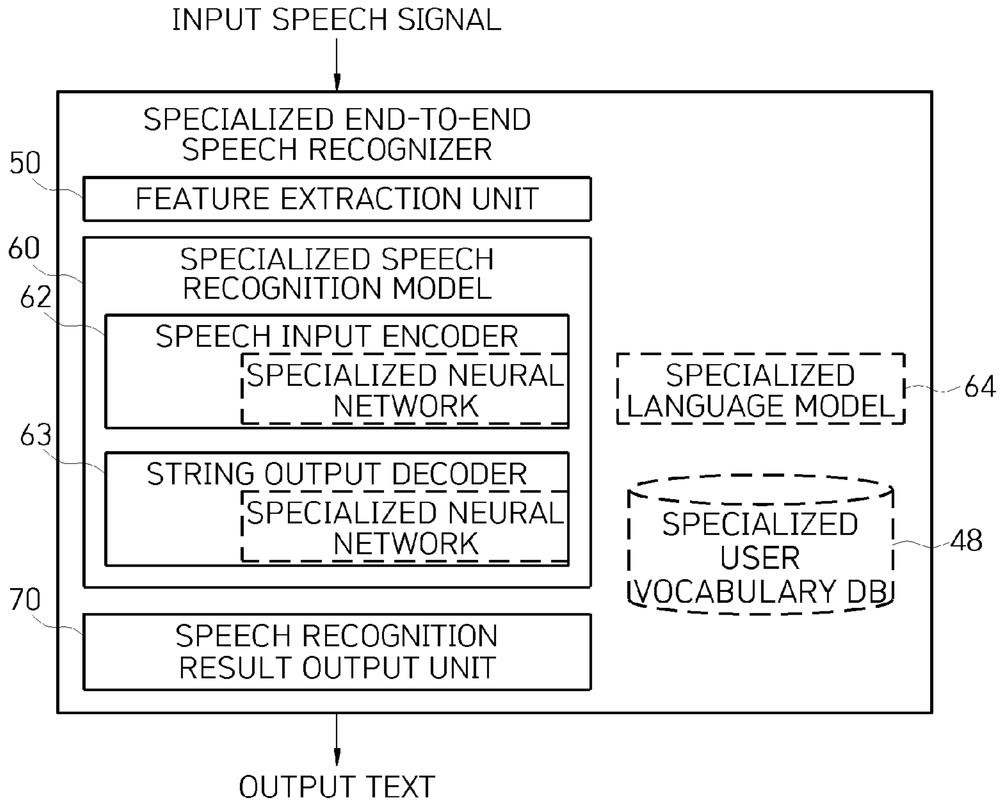
FIG. 6 is a block diagram of an end-to-end speech recognizer according to an embodiment in which a specialized language model and a specialized user vocabulary DB are additionally reflected in the end-to-end speech recognizer illustrated in FIG. 3.

FIG. 6 is a configuration diagram of a specialized end-to-end speech recognizer according to an embodiment in which the specialized language model 64 and the specialized user vocabulary DB 48 are additionally reflected in the end-to-end speech recognizer illustrated in FIG. 3. When the specialized end-to-end speech recognizer described in FIG. 3 is combined with the specialized language model 64 described in FIG. 4 and the specialized user vocabulary DB 48 described in FIG. 5, the specialized end-to-end speech recognizer of FIG. 6 is configured.

The specialized language model 64 is used by being fused with the specialized speech recognition model 60 in the form of Shallow fusion, Deep fusion, etc., and the specialized user vocabulary DB 48 is used only when calculating weights in the competition process among candidates to be recognized while present outside (when a person wants to perform Cold fusion on a language model, training needs to be performed along with training of the speech DB). Both of the specialized language model 64 and the specialized user vocabulary DB 48 may be used to reflect the weight of the specialized text, but considering the nature of the specialized language model 64 and the specialized user vocabulary DB 48, the specialized language model 64 is usually used to reflect a larger amount of specialized text in terms of its nature and the specialized user vocabulary DB may be used to reflect a relatively small amount of specialized text.

Figure 7:
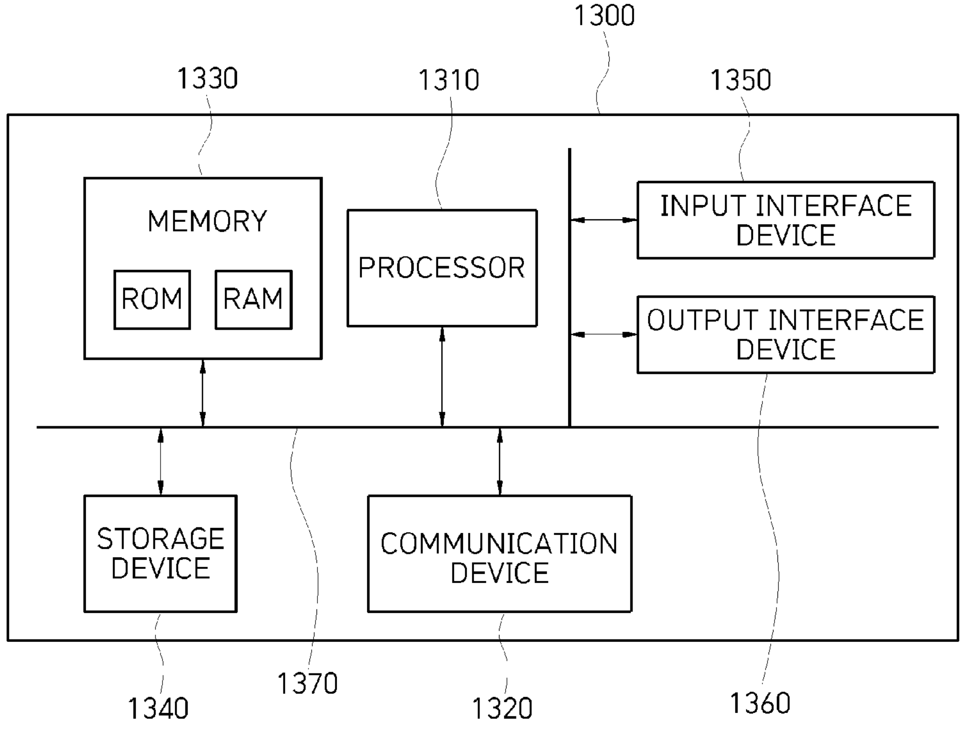
FIG. 7 is a block diagram of a computer system that may be utilized to implement the present invention.

FIG. 7 is a block diagram of a computer system that may be utilized to implement the present invention.

A computer system 1300 illustrated in FIG. 7 may include at least one of a processor 1310, a memory 1330, an input interface device 1350, an output interface device 1360, and a storage device 1340 that communicate through a bus 1370. The computer system 1300 may also include a communication device 1320 coupled to a network. The processor 1310 may be a central processing unit (CPU) or a semiconductor device that executes instructions stored in the memory 1330 or the storage device 1340. The communication device 1320 may transmit or receive a wired signal or a wireless signal. The memory 1330 and the storage device 1340 may include various types of volatile or non-volatile storage media. For example, the memory 1330 may include a read only memory (ROM) and a random access memory (RAM). The memory 1330 may be located inside or outside the processor 1810 and may be connected to the processor by various well-known means. The memory 1330 may be various types of volatile or non-volatile storage media, and may include, for example, a ROM or a RAM.

Accordingly, the present invention may be implemented as a computer-implemented method, or as a non-transitory computer-readable medium having computer-executable instructions stored thereon. In one embodiment, when executed by the processor, the computer-readable instructions may perform a method according to at least one aspect of the present disclosure.

In addition, the method according to the present invention may be implemented in the form of program commands that may be executed through various computer means and may be recorded in a computer-readable recording medium. The computer-readable recording medium may include a program command, a data file, a data structure or the like, alone or in combination. The program instructions recorded in the computer-readable recording medium may be especially designed for the embodiment of the present invention, or those known to those skilled in the field of computer software may be used. The computer-readable recording medium may include a hardware device configured to store and execute the program instructions. Examples of the computer-readable recording medium may include a magnetic medium such as a hard disk, a floppy disk, or a magnetic tape, an optical medium such as a compact disc read only memory (CD-ROM) or a digital versatile disc (DVD), a magneto-optical medium such as a floptical disc, a ROM, a RAM, a flash memory, or the like. Examples of the program instructions may include a high-level language code capable of being executed by a computer using an interpreter, or the like, as well as a machine language code made by a compiler.

According to the present invention, it is possible to specialize a domain of an end-to-end speech recognizer using only a text DB without a speech signal file in which speech is recorded. In this case, speech generated using a speech synthesizer is different from actual speech uttered by a person, but in end-to-end speech recognition, since it is very important whether text and speech are included during training more than anything else (i.e., whether the text and the speech have been observed), it is very important to reflect the speech and the text generated by the speech synthesizer in training. When the text is not reflected in the training, as a probability value of the text is trained very low, it is almost impossible for the text to be included in a speech recognition target candidate during speech recognition, but when the training is performed through the speech and text, the text has the probability value corresponding to a level at which the text can be the speech recognition target candidate, thereby enabling the speech recognition. This effect is possible because speech signal information and linguistic information are trained together during the training.

Additionally, since text that is not observed during training is highly unlikely to be a speech recognition target candidate, not only does the speech recognition performance deteriorate, but even if specialization is attempted later through a language model or through a user vocabulary registration, it is almost impossible to perform specialization only with the text. When the target text exists in competitive candidates, this specialization through the language model or the user vocabulary registration can have the effect of improving the speech recognition by increasing a weight of the target text, but when the competitiveness of the target text as a candidate is very low, the specialization effect does not appear well even if the weight of the text is increased.

For this reason, by generating a speech signal using a speech synthesizer and reflecting the generated speech signal in training, it is possible to improve the speech recognition performance by itself, and by increasing the weight of the corresponding word or sentence using the language model or the user vocabulary registration later for the text reflected in training to allow the text to take precedence over the competitive candidates, it is possible to improve the speech recognition performance.

As a result, according to the present invention, it is possible to secure the effect of improving the speech recognition performance and secure robustness through multi-speaker speech synthesis by collecting specialization target domain data on a large scale, generating speech from the collected domain data, and then performing training, and in particular, it is possible to further improve the speech recognition performance for the entire specific domain by controlling the weight through the combination of the language model and/or the user vocabulary.

Hereinabove, embodiments in which the spirit of the present invention is specifically implemented have been described. However, the technical scope of the present invention is not limited to the embodiments and drawings described above, but is defined by a rational interpretation of the claims.

What is claimed is:

1. A method, executed in a computer system including a storage device and a processor, of constructing an end-to-end speech recognition model capable of specializing a domain by using text data, the method comprising:

collecting, by the processor, domain text data of a domain that includes text that may appear in a domain to be specialized;

extracting, by the processor, a text from the collected domain text data, and constructing a domain text database (DB) through a normalization process for symbols, numbers, and foreign language notation included in the extracted text;

extracting, by the processor, a comparison candidate text from the constructed domain text DB;

comparing, by the processor, the comparison candidate text with a basic transcript text database (DB) included in the storage device;

when a number of appearances of the comparison candidate text is less than or equal to a preset threshold value, determining, by the processor, the comparison candidate text as a specialization target comparison candidate text, wherein the specialization target comparison candidate text is a domain text that is not included in the basic transcript text DB and requires additional training;

repeatedly performing, by the processor, the determining the comparison candidate text as the specialization target comparison candidate text, if it is determined that the comparison candidate text remains in the domain text DB;

constructing, by the processor, a specialization target domain text DB storing the specialization target comparison candidate text, in the storage device;

generating, by the processor, a specialization target speech signal from the specialization target comparison candidate text, using the specialization target domain text DB, thereby constructing a specialization target speech DB;

training, by the processor, a speech recognition neural network with the generated specialization target speech signal;

after the training of the speech recognition neural network is completed, generating, by the processor, an end-to-end speech recognition model specialized for the domain to be specialized; and in order to adjust a weight of specialization target domain text of the specialization target domain text DB by changing an amount of the specialization target domain text of the specialization target domain text DB, by the processor, (i) selecting a validation set and a test set that represent the specialization target domain from the specialization target domain text DB, (ii) measuring similarity between each of sentences of the validation set and a sentence embedding vector of each of sentences in the specialization target domain text DB, (iii) assigning first weights to sentences in the specialization target domain text DB having sentence embedding vectors with first similarity to sentences of the validation set, and assigning second weights to sentences in the specialization target domain text DB having sentence embedding vectors with second similarity to sentences of the validation set, to primarily generate a specialized language model, the first weights being higher than the second weights and the first similarity being higher than the second similarity, (iv) calculating perplexity for the test set using the primarily generated specialized language model, (v) in response to determining that the perplexity is higher than a predetermined target, assigning a higher weight than before to sentences in the specialization target domain text DB having the sentence embedding vectors with the first similarity to the sentences of the validation set, and assigning a lower weight than before to sentences in the specialization target domain text DB having the sentence embedding vectors with the second similarity to the sentences of the validation set, to regenerate the specialized language model;

(vi) in response to determining that the perplexity is lower than the predetermined target, assigning a lower weight than before to sentences in the specialization target domain text DB having the sentence embedding vectors with the first similarity to the sentences of the validation set, and assigning a higher weight than before to sentences in the specialization target domain text DB having the sentence embedding vectors with the second similarity to the sentences of the validation set, to regenerate the specialized language model, and (vii) repeating operations (i)-(vi) until the perplexity reaches a predetermined target expected value to generate a final specialized language model.

2. The method of claim 1, wherein the specialization target speech signal is generated using one of a single-speaker speech synthesizer and a multi-speaker speech synthesizer.

3. The method of claim 1, wherein the training of the speech recognition neural network with the specialization target speech signal includes training the speech recognition neural network from a beginning with generated specialized speech.

4. The method of claim 1, wherein the training of the speech recognition neural network with the specialization target speech signal includes additionally training an existing general speech recognition neural network using one of connection learning and transfer learning.

5. A method, executed in a computer system including a storage device and a processor, of constructing an end-to-end speech recognition model capable of specializing a domain by using text data, the method comprising:

collecting, by the processor, domain text data of a domain that includes text that may appear in a domain to be specialized;

extracting, by the processor, a text from the collected domain text data, and constructing a domain text database (DB) through a normalization process for symbols, numbers, and foreign language notation included in the extracted text;

extracting, by the processor, a comparison candidate text from the constructed domain text DB;

comparing, by the processor, the comparison candidate text with a basic transcript text database (DB) included in the storage device;

in response to a number of appearances of the comparison candidate text in the basic transcript text DB being less than or equal to a preset threshold value, determining, by the processor, the comparison candidate text as a specialization target comparison candidate text, wherein the specialization target comparison candidate text is a domain text that is not included in the basic transcript text DB and requires additional training;

repeatedly performing, by the processor, the determining the comparison candidate text as the specialization target comparison candidate text, in response to determining that the comparison candidate text remains in the domain text DB;

constructing, by the processor, a specialization target domain text DB storing the specialization target comparison candidate text, in the storage device;

generating, by the processor, a specialization target speech signal from the specialization target comparison candidate text, using the specialization target domain text DB, thereby constructing a specialization target speech DB;

training, by the processor, a speech recognition neural network with the generated specialization target speech signal;

after the training of the speech recognition neural network is completed, generating, by the processor, an end-to-end speech recognition model specialized for the domain to be specialized; and in order to adjust a weight of specialization target domain text of the specialization target domain text DB by changing an amount of the specialization target domain text of the specialization target domain text DB, by the processor, extracting a specialized user vocabulary from the specialization target domain text DB and storing the extracted specialized user vocabulary to generate a specialized user vocabulary DB, composing a sentence for evaluation including the specialized user vocabulary, constructing, for the sentence for evaluation, a speech signal utterance set for evaluation using real human voice, or constructing the speech signal utterance set for evaluation by generating a speech signal through a speech synthesizer, and performing speech recognition evaluation on the speech signal utterance set for evaluation using the speech recognizer combined with the specialized user vocabulary to assign a weight to the specialized user vocabulary in accordance with the speech recognition evaluation.

6. An apparatus for constructing an end-to-end speech recognition model capable of specializing a domain by using text data, the apparatus comprising a processor and a storage device, wherein the processor is configured to:

collect domain text data of a domain that includes text that may appear in a domain to be specialized;

extract a text from the collected domain text data, and construct a domain text database (DB) through a normalization process for symbols, numbers, and foreign language notation included in the extracted text;

extract a comparison candidate text from the constructed domain text DB;

compare the comparison candidate text with a basic transcript text database (DB) included in the storage device;

determine, in response to a number of appearances of the comparison candidate text in the basic transcript text DB being less than or equal to a preset threshold value, the comparison candidate text as a specialization target comparison candidate text, wherein the specialization target comparison candidate text is a domain text that is not included in the basic transcript text DB and requires additional training;

repeat the determining the comparison candidate text as the specialization target comparison candidate text, in response to determining that the comparison candidate text remains in the domain text DB;

construct a specialization target domain text DB storing the specialization target comparison candidate text, in the storage device;

generate a specialization target speech signal from the specialization target comparison candidate text, using the specialization target domain text DB, thereby constructing a specialization target speech DB;

train a speech recognition neural network with the generated specialization target speech signal;

generate an end-to-end speech recognition model specialized for the domain to be specialized, after the training of the speech recognition neural network is completed; and in order to adjust a weight of specialization target domain text of the specialization target domain text DB by changing an amount of the specialization target domain text of the specialization target domain text DB, (i) select a validation set and a test set that represent the specialization target domain from the specialization target domain text DB, (ii) measure similarity between each of sentences of the validation set and a sentence embedding vector of each of sentences in the specialization target domain text DB, (iii) assign first weights to sentences in the specialization target domain text DB having sentence embedding vectors with first similarity to sentences of the validation set, and assign second weights to sentences in the specialization target domain text DB having sentence embedding vectors with second similarity to sentences of the validation set, to primarily generate a specialized language model, the first weights being higher than the second weights and the first similarity being higher than the second similarity, (iv) calculate perplexity for the test set using the primarily generated specialized language model, (v) in response to determining that the perplexity is higher than a predetermined target, assign a higher weight than before to sentences in the specialization target domain text DB having the sentence embedding vectors with the first similarity to the sentences of the validation set, and assign a lower weight than before to sentences in the specialization target domain text DB having the sentence embedding vectors with the second similarity to the sentences of the validation set, to regenerate the specialized language model;

(vi) in response to determining that the perplexity is lower than the predetermined target, assign a lower weight than before to sentences in the specialization target domain text DB having the sentence embedding vectors with the first similarity to the sentences of the validation set, and assign a higher weight than before to sentences in the specialization target domain text DB having the sentence embedding vectors with the second similarity to the sentences of the validation set, to regenerate the specialized language model, and (vii) repeat operations (i)-(vi) until the perplexity reaches a predetermined target expected value to generate a final specialized language model, wherein the storage device is configured to:

store the domain text DB, the basic transcript text DB, the specialization target domain text DB, and the specialization target speech DB.

7. The apparatus of claim 6, wherein the generation of the specialization target speech signal is performed using one of a single-speaker speech synthesizer and a multi-speaker speech synthesizer.

8. The apparatus of claim 6, wherein the training of the speech recognition neural network with the specialization target speech signal includes training the speech recognition neural network from a beginning with generated specialized speech.

9. The apparatus of claim 6, wherein the training of the speech recognition neural network with the specialization target speech signal includes additionally training an existing general speech recognition neural network using one of connection learning and transfer learning.

10. An apparatus for constructing an end-to-end speech recognition model capable of specializing a domain by using text data, the apparatus comprising a processor and a storage device, wherein the processor is configured to:

collect domain text data of a domain that includes text that may appear in a domain to be specialized;

extract a text from the collected domain text data, and construct a domain text database (DB) through a normalization process for symbols, numbers, and foreign language notation included in the extracted text;

extract a comparison candidate text from the constructed domain text DB;

compare the comparison candidate text with a basic transcript text database (DB) included in the storage device;

determine, in response to a number of appearances of the comparison candidate text in the basic transcript text DB being less than or equal to a preset threshold value, the comparison candidate text as a specialization target comparison candidate text, wherein the specialization target comparison candidate text is a domain text that is not included in the basic transcript text DB and requires additional training;

repeat the determining the comparison candidate text as the specialization target comparison candidate text, in response to determining that the comparison candidate text remains in the domain text DB;

construct a specialization target domain text DB storing the specialization target comparison candidate text, in the storage device;

generate a specialization target speech signal from the specialization target comparison candidate text, using the specialization target domain text DB, thereby constructing a specialization target speech DB;

train a speech recognition neural network with the generated specialization target speech signal;

generate an end-to-end speech recognition model specialized for the domain to be specialized, after the training of the speech recognition neural network is completed; and in order to adjust a weight of specialization target domain text of the specialization target domain text DB by changing an amount of the specialization target domain text of the specialization target domain text DB, extract a specialized user vocabulary from the specialization target domain text DB, and store the extracted specialized user vocabulary to generate a specialized user vocabulary DB, compose a sentence for evaluation including the specialized user vocabulary, construct, for the sentence for evaluation, a speech signal utterance set for evaluation using real human voice, or construct the speech signal utterance set for evaluation by generating a speech signal through a speech synthesizer, and perform speech recognition evaluation on the speech signal utterance set for evaluation using the speech recognizer combined with the specialized user vocabulary to assign a weight to the specialized user vocabulary in accordance with the speech recognition evaluation, wherein the storage device is configured to:

store the domain text DB, the basic transcript text DB, the specialization target domain text DB, the specialization target speech DB, and the specialized user vocabulary DB.

* * * * *